United States Patent [19]
Tomita

[11] Patent Number: 5,122,758
[45] Date of Patent: Jun. 16, 1992

[54] DIFFERENTIAL PHASE DEMODULATOR FOR PSK-MODULATED SIGNALS

[75] Inventor: Hideho Tomita, Tokyo, Japan
[73] Assignee: NEC Corporation, Tokyo, Japan
[21] Appl. No.: 629,546
[22] Filed: Dec. 18, 1990

[30] Foreign Application Priority Data

Dec. 18, 1989 [JP] Japan .................. 1-328824
Dec. 18, 1989 [JP] Japan .................. 1-328825

[51] Int. Cl.⁵ .......................................... H03D 3/18
[52] U.S. Cl. ................................ 329/304; 329/310; 375/82; 375/84
[58] Field of Search ........... 329/304, 306, 310, 313, 329/316, 341, 343, 345, 346; 375/80, 82, 83, 84, 85, 86, 87; 328/145

[56] References Cited

U.S. PATENT DOCUMENTS

| | | | |
|---|---|---|---|
| 3,590,381 | 6/1971 | Ragsdale | 375/85 X |
| 3,643,023 | 2/1972 | Ragsdale et al. | 375/53 |
| 3,997,847 | 12/1976 | Tong | 329/310 X |
| 4,680,553 | 7/1987 | Kimure et al. | 330/2 |

Primary Examiner—David Mis
Attorney, Agent, or Firm—Sughrue, Mion, Zinn, Macpeak & Seas

[57] ABSTRACT

A differential phase demodulator for demodulating a PSK-modulated signal including a zero-cross detector for detecting zero-cross points of intermediate frequency signals of the PSK-modulated signal and generating a zero-cross detection signal; a synchronization circuit for synchronizing an externally supplied baud timing signal with the zero-cross detection signal; an oscillator for generating clock pulses; a counter for counting the clock pulses and producing a pulse count; a phase difference detector for calculating the count per period of the synchronized baud timing signal and outputting the result as the phase difference data; and a decision circuit for outputting demodulated data based on the phase difference data.

12 Claims, 4 Drawing Sheets

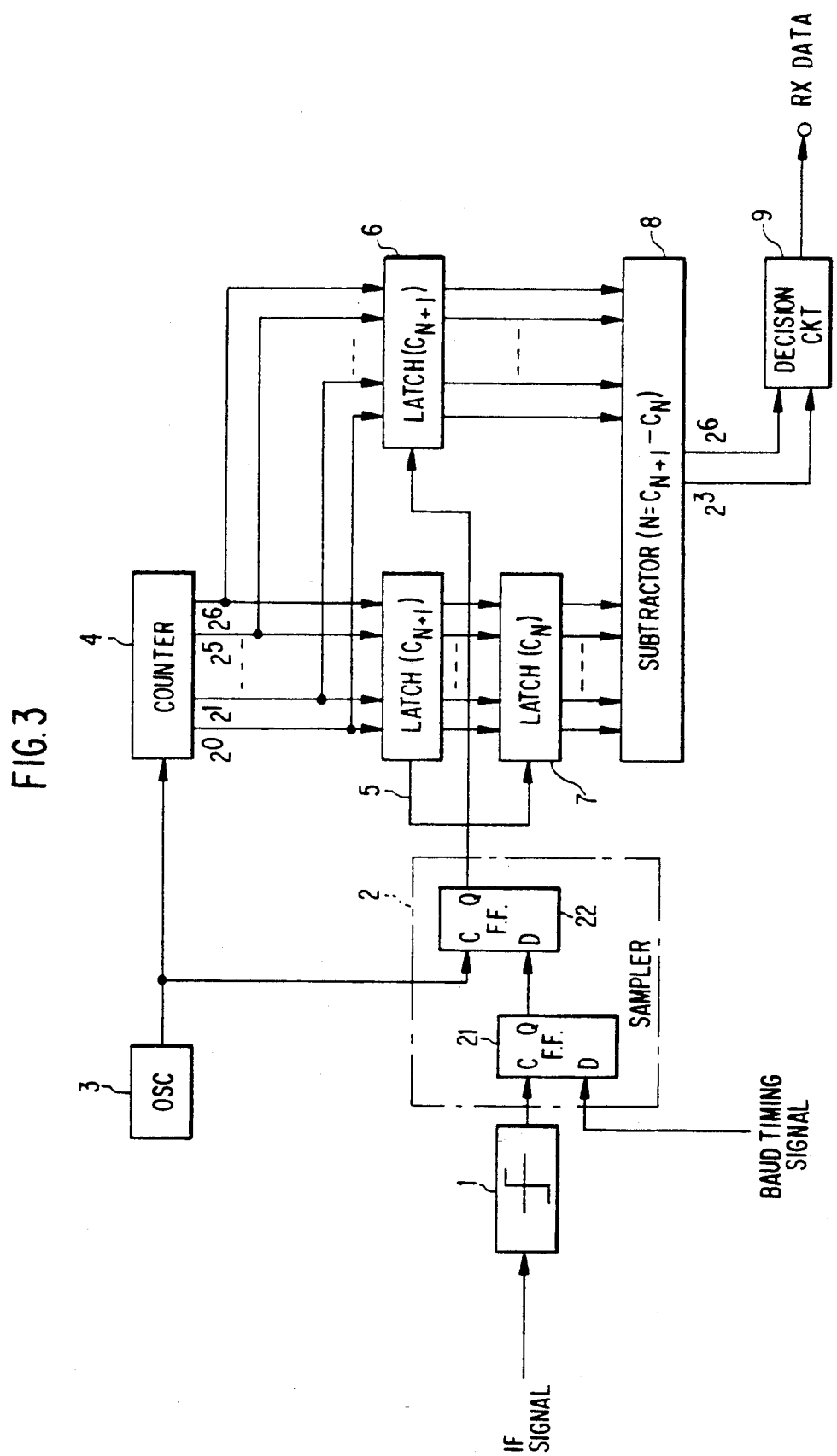

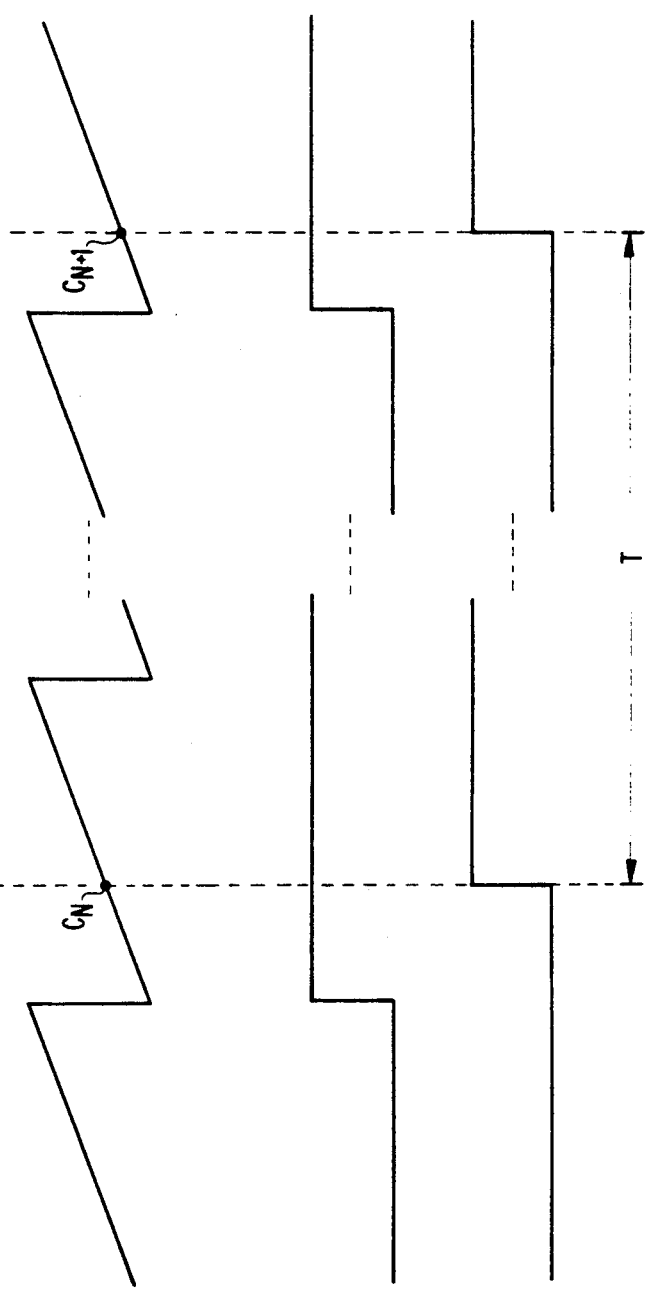
FIG. 4A  IF SIGNAL
FIG. 4B  LIMITER 1 OUTPUT
FIG. 4C  COUNTER 4 OUTPUT
FIG. 4D  BAUD TIMING SIGNAL
FIG. 4E  SAMPLER 2 OUTPUT

DIFFERENTIAL PHASE DEMODULATOR FOR PSK-MODULATED SIGNALS

BACKGROUND OF THE INVENTION

The present invention relates to a demodulator for PSK-demodulating intermediate frequency (IF) signals of a PSK-modulated carrier with digital data, and more particularly to a demodulator of this kind using differential detection.

One of the prior art differential phase demodulators or differential detection demodulators of this kind achieves data demodulation by determining the phase variation during a one-baud interval after converting an IF signal into I and Q baseband channels. As will be explained in more detail below, such a demodulator involves the drawbacks of having complex configuration, which makes it difficult for the circuit to be arranged in small dimensions, and many aspects needing adjustment, such as the linearity and gain of the frequency discriminator and the balance between the I and Q baseband channels.

Another prior art demodulator which comprises a frequency discriminator and an integrate and dump (ID) circuit is subject to a greater error rate depending on the phase varying condition of input signals besides the need to adjust the constituent elements of the circuit to achieve overall characteristics of the demodulator.

SUMMARY OF THE INVENTION

An object of the present invention is to provide a differential phase demodulator which permits arrangement in small dimensions and requires no adjustment.

Another object of the invention is to provide a timing extraction circuit which is suitable for a differential phase demodulator and capable of readily extracting baud timings from input signals.

According to the invention, there is provided a PSK-modulated signal demodulating circuit comprising a zero-cross detector for receiving an intermediate frequency (IF) signal of a PSK-modulated carrier, detecting the zero-cross point of the IF signals and generating a zero-cross detection signal. A synchronizing circuit receives an externally supplied baud timing signal extracted from the IF signal and the zero-cross signal, and supplies a synchronized baud timing signal by synchronizing the baud timing signal with the zero-cross signal. An oscillator generates clock pulse signals having a predetermined frequency. A counter receives the clock pulse signals, counts the clock pulses and supplies a pulse count. A phase difference detector receives the pulse count and the synchronized baud timing signal, calculates the count per period of the synchronized baud timing signal and supplies the result as the phase difference data. A decision circuit receives the phase difference data, decides received data based on the phase difference data and supplies the result of the decision as the received data.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 3 is a block diagram illustrating a preferred embodiment of the invention;

FIGS. 4a to 4e are waveform diagrams for describing the operation of the circuit illustrated in FIG. 3.

DETAILED DESCRIPTION OF THE PREFERRED EMBODIMENT

In order to facilitate understanding of the present invention, the prior art will be described first.

Figure 1:
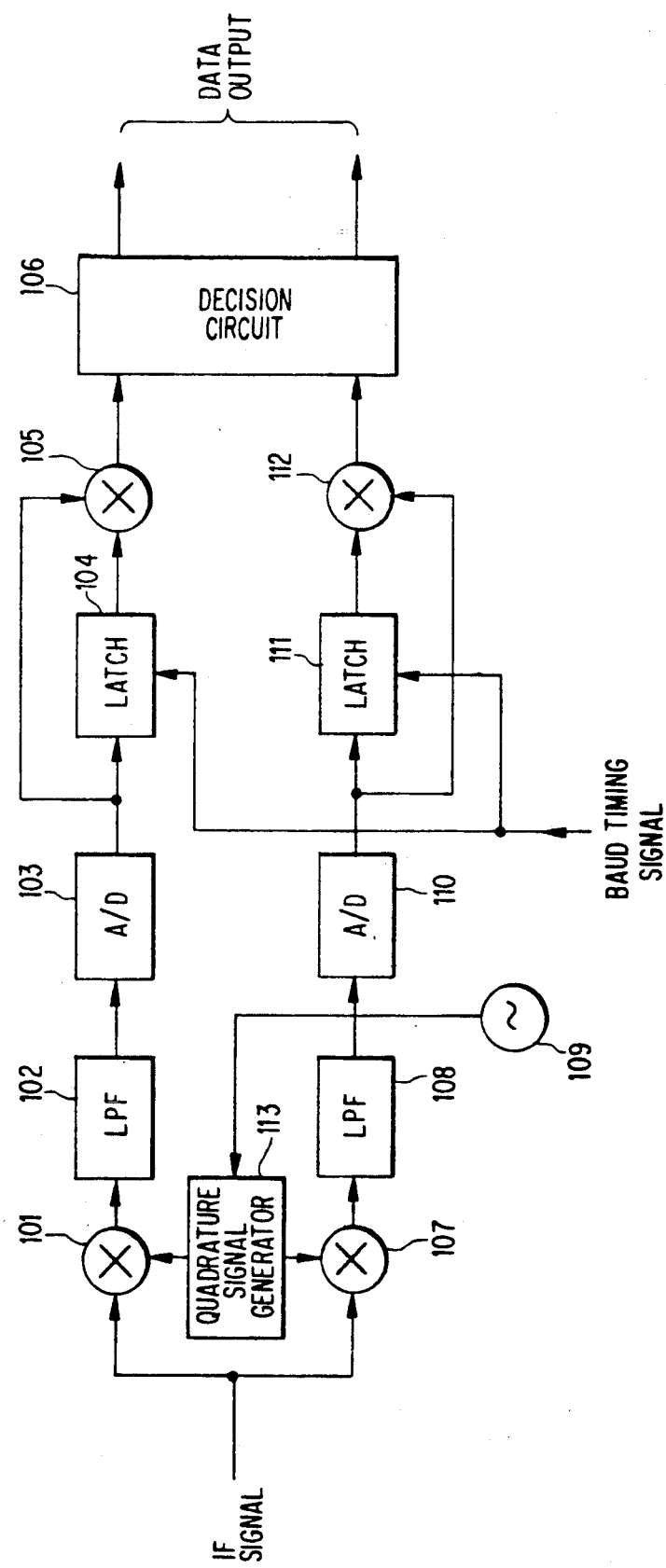
FIG. 1 is a block diagram illustrating one example of the prior art.

FIG. 1 the differential detection demodulator includes first, second, third and fourth multipliers 101, 107, 105 and 112, first and second low-pass filters 102 and 108, first and second analog-to-digital (A/D) converters 103 and 110, first and second latches 104 and 111, a decision circuit 106, a local oscillator 109 and a quadrature signal generator 113.

An intermediate frequency (IF) signal of a digitally phase-modulated, for instance a QPSK-modulated, input signal is supplied to the first and second multipliers 101 and 107. A reference signal, having a frequency almost equal to that of the input IF signal, generated by the local oscillator 109 is fed to the quadrature signal generator 113, which supplies the reference signal, for example, to the first multiplier 101 as it is and to the second multiplier 107 after delaying it by $\pi/2$. As a result, the IF signal is converted by the first and second multipliers into I and Q channel baseband signal. The first and second low-pass filters (LPF's) 102 and 108 remove higher harmonic components from the I and Q channel baseband signal. These baseband signals are converted by the first and second A/D converters 103 and 110 into digital baseband signals each having a prescribed number of bits. The third and fourth multipliers 105 and 112 multiply the digital baseband signals by delayed digital baseband signals, which result from one-baud interval delaying by the first and second latches 104 and 111, to determine the quantity of phase variation per baud. This phase variation quantity is subjected to decision by the decision circuit 106, and the result of the decision is supplied as demodulated data.

Figure 2:
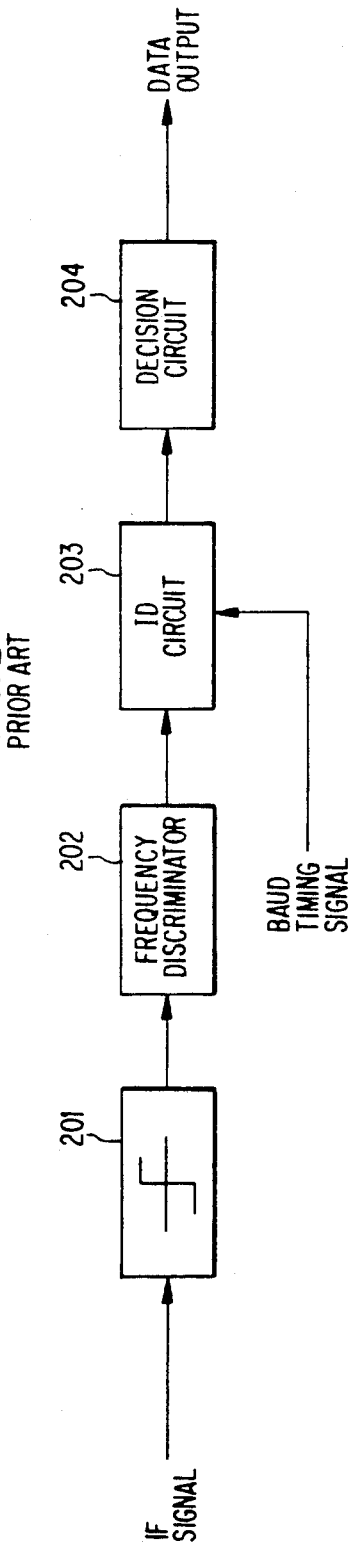
FIG. 2 is a block diagram illustrating another example of the prior art.

On the other hand, the demodulating circuit illustrated in FIG. 2 comprises a limiter 201, a frequency discriminator 202, an integrate and dump (ID) circuit 203 and a decision circuit 204. In this circuit, a digitally-phase modulated input signal is limited in amplitude by the limiter 201. The frequency discriminator 202 differentiates the phase of the input signal, and supplies a voltage corresponding to the phase variation per unit of time (phase modulation rate). The ID circuit 203 receives the voltage indicating the phase modulation rate from the frequency discriminator 202, and detects the phase variation per baud by integration. The phase variation per baud detected by the ID circuit 203 is converted by the decision circuit (multilevel comparator) 204 into converted data which corresponding to the amount of phase modulation, and the converted data is supplied as demodulated data.

These demodulation circuits of the prior art have the problems described above.

FIG. 3 is a block diagram illustrating a preferred embodiment of the invention.

This embodiment will be described with reference to an example in which 42 KBPS (baud per second) IF signals of a $\pi/4$-QPSK-modulated signal are supplied as input signals. In FIG. 3, the demodulator comprises a limiter 1, a local oscillator 3, a sampler 2, first to third latches 5 to 7, a counter 4, a subtractor 8 and a decision circuit 9.

The operation of this preferred embodiment is described below with reference to FIGS. 4a to 4e. Suppose, for instance, a 455 kHz IF signal (FIG. 4a) is fed to the limiter 1. The limiter 1 converts the IF signal to a logic level (FIG. 4b). The limited IF signal is given to the sampler 2. The sampler 2, including first and second flip-flops (F/F's) 21 and 22, adjusts the timings of the limited IF signal using an externally supplied baud timing signal which is extracted from the IF signal (FIG. 4d) and a reference clock signal from the local oscillator 3. The first F/F 21 receives the limited IF signal at its clock terminal and the baud timing signal at its data terminal, and synchronizes the baud timing signal with a level transition point, for instance the leading edge, of the limited IF signal to produce a first sampled baud timing signal. Further, the second F/F 22 synchronizes the first sampled baud timing signal (FIG. 4e) with a reference clock signal generated by the local oscillator 3 and generates a second sampled baud timing signal or simply a sampled baud timing signal. Meanwhile, the reference clock signal is also supplied to the counter 4, which counts the pulses of the reference clock signal and supplies a counter output. The oscillating frequency $f_o$ of the local oscillator 3 is in a relationship of $f_o = n \times f$ to the frequency f of the IF signal, where n is the required phase resolution (the number of counts into which $2\pi$ is to be divided). The number of necessary bits of the counter 4 may be $(x-1)$ if $n=2^x$. In this preferred embodiment, f is supposed to be 455 kHz and $n=128$ ($=2^7$), and accordingly $f_o=128 \times 455 = 58.24$ MHz, so that the counter 4 is a seven-bit counter. Suppose now that the counter 4 keeps on counting from 0 to 127 (FIG. 4c). The counter output, which is phase information, is latched by the latches 5 and 6 at the leading edge of the sampled baud timing signal from the sampler 2. The output of the first latch 5 is delayed by the third latch 7 by a one-baud interval, while the output of the second latch 6 is supplied as it is to the subtractor 8. The subtractor 8 determines the difference between the output $C_N$ (FIG. 4c) of the third latch 7, which is the phase information measured for the previous baud interval, and the output $C_{(N+1)}$ of the second latch 6 (FIG. 4c), which is the phase information measured for the present baud interval. Since this difference represents the phase difference between baud intervals, data decision is then possible according to the value of this difference. In this embodiment, as $2\pi$ is divided into 128 counts and $\pi/4$-QPSK modulation represents data with phase difference which is integer multiple of $\pi/2$, data decision is possible for every 32 ($=2^5$) counts ($=128/4$), i.e. the two most significant bits of the seven-bit result produced by the subtractor 8. The decision circuit 9 performs data decision according to the two most significant bits of the seven-bit result of the subtractor 8, and supplies the result as received data.

Figure 5:
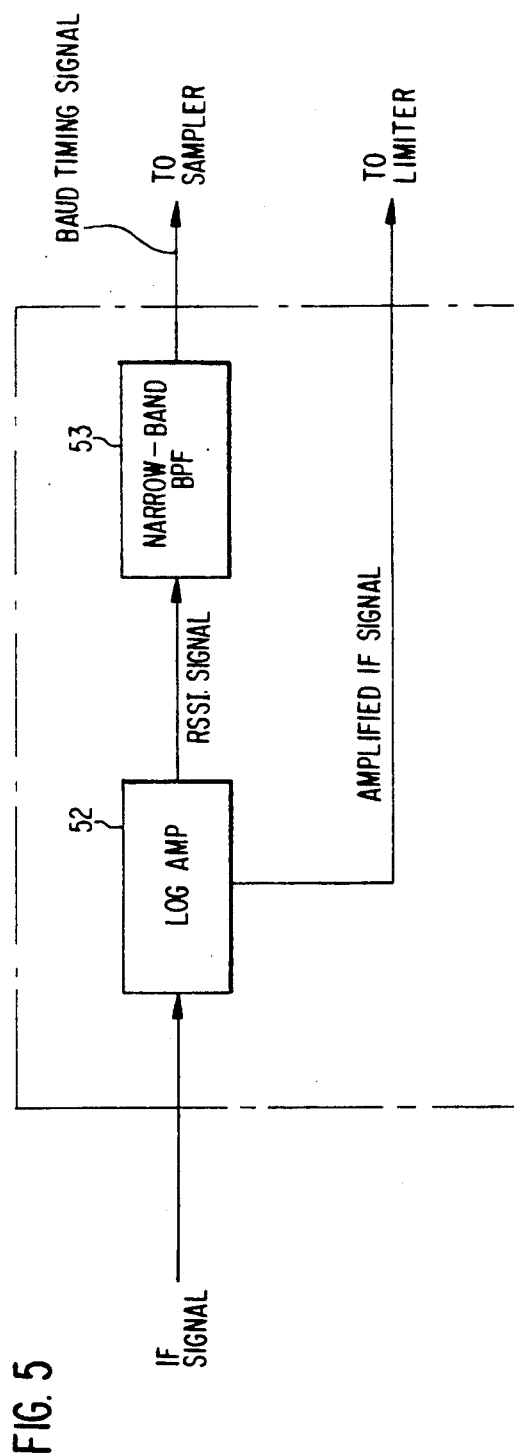
FIG. 5 is a block diagram illustrating a baud timing extraction circuit for use in the invention.

FIG. 5 is a block diagram illustrating a baud timing extraction circuit for use in the invention. In FIG. 5, the baud timing extraction circuit comprises a log amplifier 52 and a narrow-band band-pass filter 53. An IF signal, from which noise has been removed by a band-pass filter among others (not shown), is entered into the log amplifier 52. A $\pi/4$-QPSK-modulated signal is substantially reduced in amplitude when the vector of the signal point varies by $\pm 3\pi/4$. Therefore, the filter 53 can detect the baud timing from a received signal strength indicator (RSSI) signal as amplitude information of the IF signal which results from log conversion of the envelope of the IF signal by the log amplifier 52. The log amplifier 52 also amplifies the IF signal and supplies the amplified IF signal to the limiter 1 illustrated in FIG. 3. For such an amplifier circuit for IF signals having a field strength detecting function, there can be used, for example, that which is disclosed in the U.S. Pat. No. 4,680,553. RSSI signals, which are generated to measure the received field strength in, for instance, the receiver section of a mobile radio system, permit the supply of a baud timing signal with few additional circuits. For the narrow-band pass filter 53 in FIG. 5, a PLL circuit or a tank circuit can be used, for example.

As described, the demodulator according to the present invention has a configuration in which a counter for counting reference clock pulses at a frequency sufficiently higher than that of IF signals is provided, the count of this counter is sampled at a baud timing synchronized with the zero-cross point of the IF signals, and the quantity of phase variation in a one-baud interval is detected from the difference of consecutive samples, which thereby makes it possible to achieve demodulation of PSK signals with a simple circuit that can be arranged in small dimensions. Further because of the characteristics of the $\pi/4$-QPSK modulation system, there further is the benefit of readily achieving baud timing extraction by entering RSSI signals, resulting from the log conversion of the envelope of the IF signals, into a narrow-band pass filter.

Although the leading edge of the limiter output is used as the zero-cross point of the IF signals in this preferred embodiment, the trailing edge can be used as well. The higher the oscillating frequency of the local oscillator, the more precisely the quantity of phase variation can be detected, but the greater the power consumption will be. Therefore, the frequency can be set at a reasonable level with due account taken of the level of the quantizing noise. Further, if the configuration of FIG. 3 is so modified as to feed the output of the first latch 5, instead of that of the second latch 6, to the subtractor 8, the second latch 6 can be dispensed with.

What is claimed is:

1. A demodulator for demodulating an intermediate frequency (IF) signal of a PSK-modulated signal and producing decoded data, comprising:

zero-cross detecting means for detecting the zero-cross points of said IF signal and generating a zero-cross detection signal;

synchronizing means which comprises flip-flop means for receiving said zero-cross detection signal as a first clock signal and said baud timing signal as a data input signal and for producing a synchronized baud timing signal synchronous with said zero-cross detection signal;

oscillator means for generating a second clock signal having a predetermined frequency;

counter means for counting said second clock signal and for producing a counter output;

phase difference detecting means responsive to said counter output and said synchronized baud timing signal for calculating a change in said counter output per period of said synchronized baud timing signal and for producing phase difference data based on the change calculated; and decision means responsive to said phase difference data for deciding received data based on said phase difference data and for producing said decoded data based on the received data decided.

2. A demodulator, as claimed in claim 1, wherein said phase difference detecting means comprises:
   first latching means for latching said counter output in accordance with said synchronized baud timing signal and for outputting a first counter output;
   delaying means for delaying said first counter output by one period of said synchronized baud timing signal to produce a second counter output; and
   arithmetic means for determining a difference between said first and second counter outputs and for outputting said phase difference data based on the difference.

3. A demodulator for demodulating an intermediate frequency (IF) signal of a PSK-modulated signal and producing decoded data, comprising:
   zero-cross detecting means for detecting the zero-cross points of said IF signal and generating a zero-cross detection signal;
   baud timing signal generating means for receiving said IF signal and for generating said baud timing signal representing a baud timing of said IF signal using received field strength of said IF signal;
   synchronizing means responsive to said baud timing signal derived from said IF signal and said zero-cross detection signal for synchronizing said baud timing signal with said zero-cross signal and for producing a first clock signal having a predetermined frequency;
   oscillator means for generating a second clock signal having a predetermined frequency;
   counter means for counting said second clock signal and for producing a counter output;
   phase difference detecting means responsive to said counter output and said synchronized baud timing signal for calculating a change in said counter output per period of said synchronized baud timing signal and for producing phase difference data based on the change calculated; and
   decision means responsive to said phase difference data for deciding received data based on said phase difference data and for producing said decoded data based on the received data decided.

4. A demodulator, as claimed in claim 3, wherein said baud timing signal generating means comprises:
   received signal strength indicate (RSSI) signal generating means for generating an RSSI signal indicating received field strength of said IF signal; and
   a narrow-band pass filter, operatively connected to said received signal strength indicate signal generating means, for receiving said RSSI signal and for generating said baud timing signal.

5. A method for generating a baud timing signal from a phase-shift modulated intermediate-frequency (IF) signal which indicates baud timing of said IF signal, said method comprising the steps of:
   (a) detecting amplitude information of said IF signal;
   (b) extracting a baud timing component from said amplitude information; and
   (c) generating said baud timing signal from said baud timing component.

6. A method claimed in claim 5, wherein said detecting step (a) comprises the steps of:
   (a1) rectifying said IF signal; and
   (a2) producing an envelope signal of said IF signal as said amplitude information.

7. A method claimed in claim 5, wherein said detecting step (a) comprises the steps of:
   (a1) rectifying said IF signal;
   (a2) producing an envelope signal of said IF signal;
   (a3) transforming said envelope signal by logarithm transform; and
   (a4) outputting a transformed envelope signal as said amplitude information.

8. A baud timing signal generating circuit for generating said baud timing signal from a phase-shift modulated signal, comprising:
   amplitude information signal generating means for receiving said modulated signal and for generating amplitude information signal of said modulated signal; and
   narrow-band filter means for extracting a baud timing component of said modulated signal from said amplitude information signal, and for producing said baud timing signal in response to said extracted baud timing.

9. A circuit claimed in claim 8, wherein said amplitude information signal generating means comprises:
   rectifier means for rectifying said modulated signal and for producing an envelope signal of said modulated signal as said amplitude information signal.

10. A circuit claimed in claim 8, wherein said amplitude information signal generating means comprises:
    rectifier means for rectifying said modulated signal and for generating an envelope signal of said modulated signal; and
    transform means for transforming said envelope signal by logarithm transformation and for outputting said transformed signal as said amplitude information signal.

11. A circuit claimed in claim 8, wherein said narrow-band filter means is a PLL circuit means.

12. A circuit claimed in claim 8, wherein said narrow-band filter means is a timing tank circuit means.

* * * * *